J. G. FISCHER & E. CHINN.
HUMANE HITCH.
APPLICATION FILED JUNE 7, 1910.
1,036,207.
Patented Aug. 20, 1912.
2 SHEETS—SHEET 2.
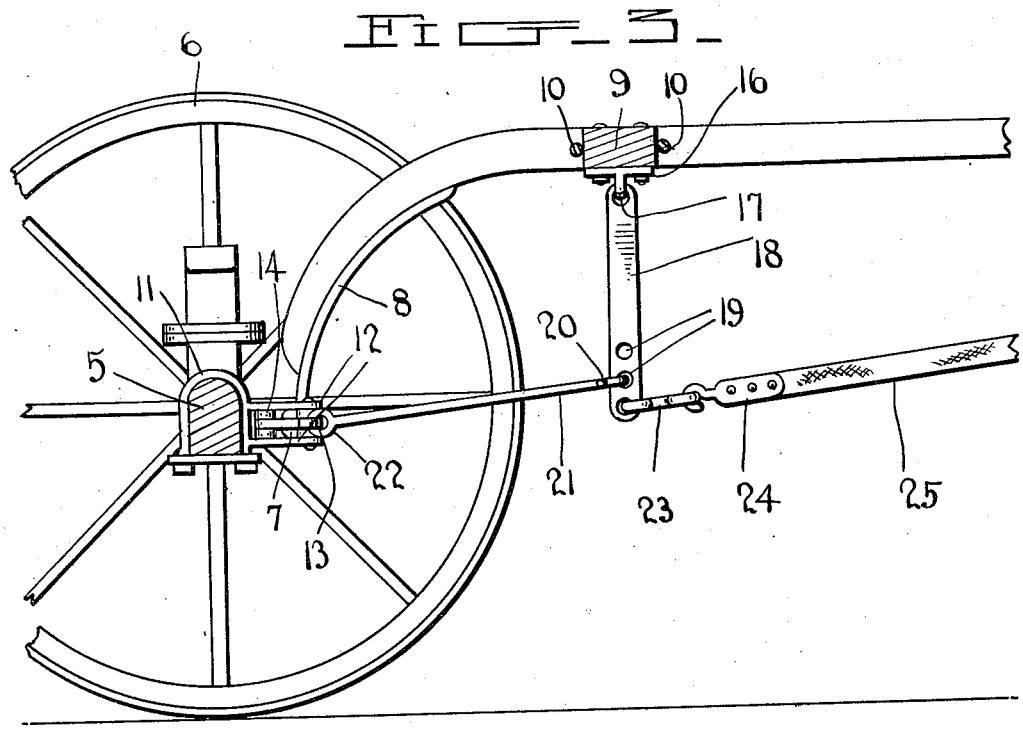
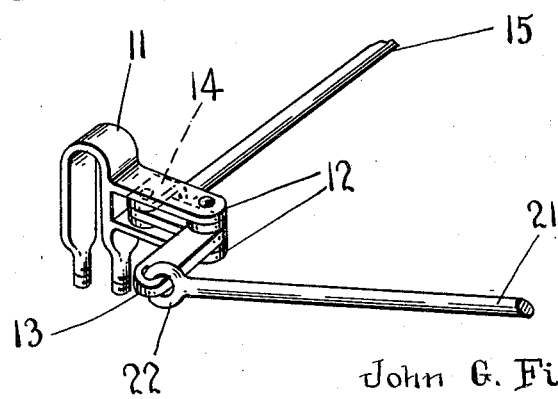
Witnesses
L. B. James
M. O. Tauber
Inventors
John G. Fischer &
Emmett Chinn
By Chandler & Chandler
Attorneys

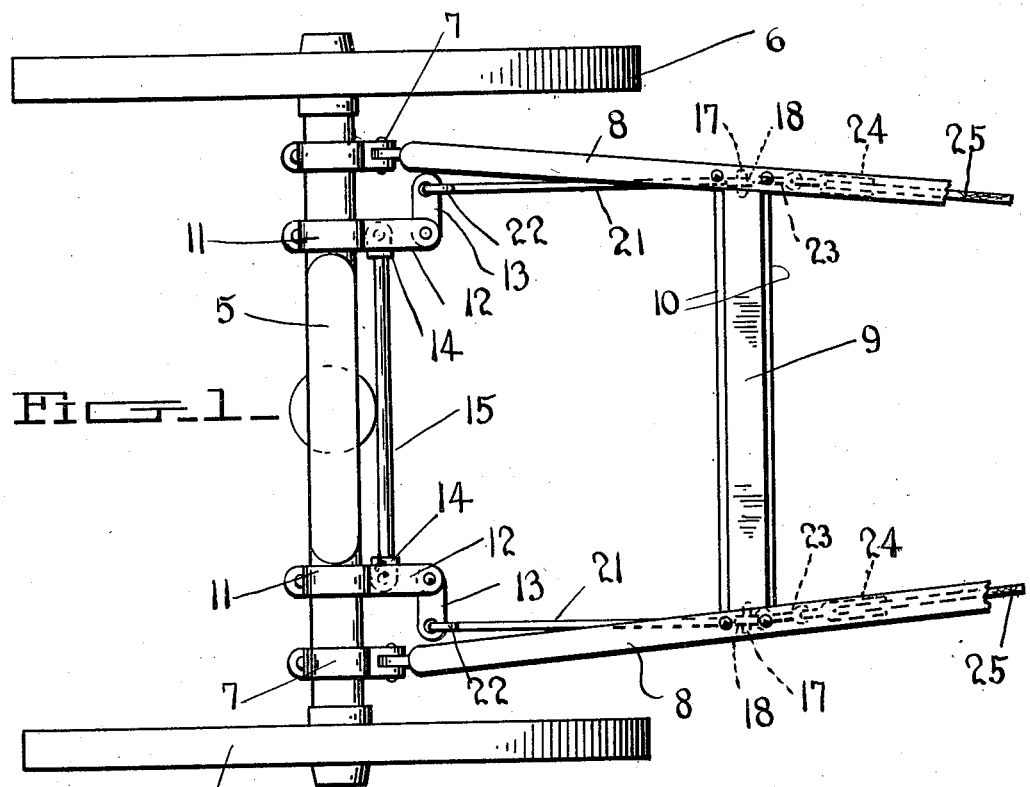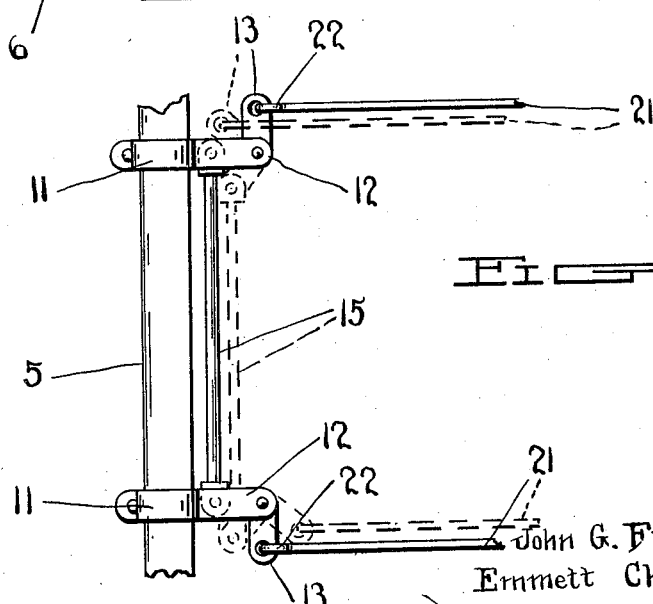

UNITED STATES PATENT OFFICE.

JOHN G. FISCHER AND EMMETT CHINN, OF ST. LOUIS, MISSOURI.

HUMANE HITCH.

1,036,207.  Specification of Letters Patent.  Patented Aug. 20, 1912.

Application filed June 7, 1910. Serial No. 565,465.

*To all whom it may concern:*

Be it known that we, JOHN G. FISCHER and EMMETT CHINN, citizens of the United States, residing at St. Louis, State of Missouri, have invented certain new and useful Improvements in Humane Hitches; and we do hereby declare the following to be a full, clear, and exact description of the invention, such as will enable others skilled in the art to which it appertains to make and use the same.

The invention relates to a humane hitch and more particularly to the class of vehicle hitching devices.

The primary object of the invention is the provision of a device of this character in which all strain or draft will be relieved from the back or neck of an animal when hitched to a vehicle for pulling the same.

Another object of the invention is the provision of a device of this character in which the animal when hitched to the thills of a vehicle will have the required freedom of shoulder play when pulling forward and advancing the vehicle, the weight of the load on the vehicle being relieved from the back or neck of the animal as the vehicle is being advanced.

A further object of the invention is the provision of a device of this character which may be connected with the thills and to the front axle of varying style vehicles without requiring any alteration or change in the construction of the thills of the front axles.

A still further object of the invention is the provision of a device of this character which will obviate the downward pulling effect of the thills upon the back of an animal and also that will relieve the strain from either the neck or back of the animal due to excessive load on the vehicle to which the animal is hitched.

A still further object of the invention is the provision of a device of this character which is simple in construction, thoroughly reliable and efficient in operation and inexpensive in manufacture.

With these and other objects in view the invention consists in the construction, combination and arrangement of parts as will be hereinafter more fully described, illustrated in the accompanying drawings, disclosing the preferred form of embodiment of the invention and pointed out in the claims hereunto appended.

In the drawings:—Figure 1 is a top plan view of the front axle of a vehicle and the thills connected thereto with the invention applied. Fig. 2 is a fragmentary top plan view of the bell crank levers and their adjunct parts connected thereto, the same being shown in shifted position by dotted lines. Fig. 3 is a vertical sectional view. Fig. 4 is a detail perspective view of one of the axle clips in which is mounted one bell crank lever and its connecting rods.

Similar reference characters indicate corresponding parts throughout the several views in the drawings.

Referring to the drawings by numerals 5 designates the ordinary front axle of a vehicle on which are journaled the usual front supporting wheels 6 and to this axle is connected by the usual thill connections 7 the shafts or thills 8 the same being united by a thill cross bar 9 at opposite longitudinal edges of which are disposed parallel tie rods 10 the same being suitably fastened at their ends to the said thills 8 and by means of these tie rods the thills are materially strengthened and reinforced to prevent the disconnection thereof from the thill cross bar when in use.

The hitching device comprises a pair of inverted U-shaped axle clips 11 the same embracing and secured in any convenient manner to the front axle 5 in spaced relation to each other and inside of the points of connection of the thill coupling 7 with said axle. Each clip 11 is formed with forwardly extending spaced parallel ears 12 and between the ears 12 of the said clips are pivoted bell crank levers 13 each having one arm outturned while the other arm extends in a rearward direction and to these latter arms are pivotally connected the forked ends 14 of a uniting link or crossed connecting rod 15 so that on the movement of one bell crank lever the other will simultaneously move therewith.

Secured to the under faces of the thills 8 in alinement with the thill cross bar 9 are plates 16 having depending eyes 17 with which are loosely connected the upper ends of swinging bars 18 each containing near its lower end a series of spaced openings 19 and with any one opening 19 in both series contained in the bars 18 are loosely connected the forward eye terminals 20 of links 21 the same having their rear eye terminals 22 connected to the outturned arms of the bell crank levers 13. It is obvious that the forward end of these links 21 may be adjusted on the bars 18 by reason of the provision of the series of openings in the lower ends thereof.

Loosely connected to the lower openings of both series in the bars 18 are short eye members 23 to which are detachably engaged the hook ends 24 of traces 25 the same being connected with the breast strap or collar (not shown) of ordinary harness for draft animals whereby they may be hitched to the thills of a vehicle.

Heretofore the traces 25 have been connected directly to the ordinary whiffletree of the thills but in the present construction the traces are connected to the swinging bars 18 the latter being connected to bell crank levers 13 through the medium of links 21, which bell crank levers are joined by means of the tie rod 15 so that by movement of one bell crank lever its motion will be transported to the other bell crank lever thereby permitting the requisite shoulder play of a draft animal when pulling the vehicle and also the draft strain due to heavy loading of a vehicle will be relieved from the back and neck of an animal when hitched to the thills so that possibility of injury to the animal resulting from burdening the load upon the back and neck portion of the said animal is reduced to a minimum.

What is claimed is:—

1. In a hitch, the combination with the front axle of a vehicle and thills connected thereto, of clips removably attached to the axle and having forwardly extending portions, bell crank levers pivotally supported by said forwardly extending portions of the clips, a cross rod connecting the rearwardly extending portions of said bell crank levers, a cross bar connecting the thills, depending swinging bars connected to the underfaces of the thills adjacent to the cross bar, links connecting the outwardly extending portions of the bell crank levers and adjustably attached to the swinging bars and links also adjustably attached to said bars for connection with trace ends on a line with the axle of the vehicle.

2. The combination with a vehicle axle and thills connected thereto for pivotal movement; of a cross bar connecting the thills and braced in position, inverted U-shaped clips detachably connected to the axle inwardly of the attaching points of the thills and having spaced forwardly extending ears, bell crank levers pivotally supported at the forward ends of said ears and between the same, a rod having forked ends connected to the normally rearwardly extended arms of the levers, plates secured to the underfaces of the thills adjacent to the cross bar and having depending eyes, depending swinging bars loosely connected at their upper ends in said eyes and having a series of spaced openings adjacent their lower ends, adjustable attaching means for trace ends connected to said bars and connections from the normally outwardly extending arms of the levers with said bars.

In testimony whereof, we affix our signatures, in presence of two witnesses.

JOHN G. FISCHER.
EMMETT CHINN.

Witnesses:
E. S. FROST,
W. A. LEONARD.

---

Copies of this patent may be obtained for five cents each, by addressing the "Commissioner of Patents, Washington, D. C."